(12) United States Patent
Fattouch et al.

(10) Patent No.: US 7,386,315 B2
(45) Date of Patent: Jun. 10, 2008

(54) METHOD FOR SCALING THE RADIO INTERFACE FOR GPRS TRAFFIC AND MIXED GPRS AND VOICE GSM TRAFFIC

(75) Inventors: Imad Fattouch, Paris (FR); Stéphane Parniere, Saint Germain en Laye (FR)

(73) Assignee: Societe Francaise du Radiotelephone, Paris la Defense (FR)

( * ) Notice: Subject to any disclaimer, the term of this patent is extended or adjusted under 35 U.S.C. 154(b) by 1203 days.

(21) Appl. No.: 10/665,103

(22) Filed: Sep. 18, 2003

(65) Prior Publication Data
US 2004/0110509 A1  Jun. 10, 2004

(30) Foreign Application Priority Data
Sep. 23, 2002 (FR) .................................. 02 12005

(51) Int. Cl.
*H04Q 7/20* (2006.01)
(52) U.S. Cl. ................... 455/445; 455/446; 455/452.2; 370/347; 370/350; 370/352
(58) Field of Classification Search ................ 455/445, 455/446, 452.2; 370/347, 350, 352
See application file for complete search history.

(56) References Cited

U.S. PATENT DOCUMENTS 5,131,020 A * 7/1992 Liebesny et al. ........ 455/414.3
6,636,739 B1 * 10/2003 Fagen et al. .............. 455/453

FOREIGN PATENT DOCUMENTS

FR 2818852 6/2002
WO WO 02/51181 6/2002

* cited by examiner

Primary Examiner—Quynh H. Nguyen

(57) ABSTRACT

The simulation system according to the invention memorizes data representative of results of GPRS transfer quality measurements (11) made on test platform or similar for a variable number of time slots available for GPRS, of at least one quality of service indicator (52), of at least one cell configuration (20) and of traffic volumes for the GSM circuit and GPRS data transfers (51). Said system uses this data to simulate (21) arrivals of GSM circuit calls and GPRS data transfers, and subsequently to calculate a level of GPRS performance achieved for a selected cell configuration (20).

With the method of the invention it is possible, by dichotomy, to scale the radio interface of a given cell for a given traffic.

13 Claims, 5 Drawing Sheets

| | 1<br>Data<br>transfer | 2<br>Simultaneous<br>data<br>transfers | 3<br>Simultaneous<br>data<br>transfers | 4<br>Simultaneous<br>data<br>transfers | 5<br>Simultaneous<br>data<br>transfers | 6<br>Simultaneous<br>data<br>transfers |
|---|---|---|---|---|---|---|
| 1 TS GPRS | ... | ... | ... | | | |
| 2 TS GPRS | 18.3 kbit/s | ... | ... | | | |
| 3 TS GPRS | 27 kbit/s | 13.6 kbit/s | ... | | | |
| 4 TS GPRS | ... | 18 kbit/s | 12.2 kbit/s | | | |
| 5 TS GPRS | ... | 23.1 kbit/s | 15.1 kbit/s | | | |
| 6 TS GPRS | ... | 27.4 kbit/s | 18 kbit/s | | | |

| | 0<br>Data<br>transfer | 1<br>Data<br>transfer | 2<br>Simultaneous<br>data<br>transfers | 3<br>Simultaneous<br>data<br>transfers | 4<br>Simultaneous<br>data<br>transfers | 5<br>Simultaneous<br>data<br>transfers | 6<br>Simultaneous<br>data<br>transfers |
|---|---|---|---|---|---|---|---|
| 0 TS libre | OK | NOK | NOK | NOK | NOK | NOK | NOK |
| 1 TS GPRS | OK | NOK | NOK | ... | ... | ... | ... |
| 2 TS GPRS | OK | OK | | | | | |
| 3 TS GPRS | OK | OK | | | | | |
| 4 TS GPRS | OK | OK | OK | | | | |
| 5 TS GPRS | OK | OK | OK | OK | | | |

400

METHOD FOR SCALING THE RADIO INTERFACE FOR GPRS TRAFFIC AND MIXED GPRS AND VOICE GSM TRAFFIC

The present invention concerns scaling the GPRS network, and more particularly, in order to improve the quality of service in this type of operator-managed network, a method for scaling the radio interface to meet GPRS traffic and mixed GPRS and voice GSM traffic.

A method and a platform are known in the prior art, from patent FR 2 818 85, to evaluate the vocal quality of telephone communications. With this evaluation method, applied using a measurement platform, it is possible to collect data relating to the quality of vocal communications by establishing connections between experimenters. This, essentially analytical, method which relates solely to the criterion of vocal quality cannot be used for scaling the GPRS network.

The GPRS offers a larger passband than GSM and allows multimedia applications for mobiles. To reconcile both quality of service and comfort of use with optimal benefit of radio resources, pertinent configuration is required of the number of channels to be allocated to each network cell, which means configuring the number of time slots or simply slots as they are called by persons skilled in the art. This requires sizing the network to estimate the capacity to be added within the network. This added capacity must allow both flow of traffic and the attainment of a certain quality of service desired by the operator.

The solutions provided by the prior art do not take into account either the end-to-end issues, with every protocol layer, or the imperfection in algorithm allocation of radio resources particular to the provider. Existing methods also give theoretical results that are very different to those observed in situ. There is a need for better apprehension of the manner in which radio resources are distributed within the GPRS network so that this network can be optimally scaled.

The present invention therefore sets out to eliminate one or more disadvantages of the prior art by defining a method for scaling the radio interface for GPRS traffic and mixed GPRS+voice GSM so as to determine, for a given cell configuration and as per the service quality specified by marketing departments, the number of channels to be reserved for GPRS applications.

For this purpose, the invention concerns a method for scaling the radio interface for GPRS traffic and mixed GPRS+voice GSM traffic, by use of a test platform comprising at least one cell model of a mobile radiotelephone network and a traffic simulation system memorizing at least one service quality indicator, at least one cell configuration as well as traffic volumes for voice GSM and GPRS data transfers, which method is characterized in that:
measurements representative of GPRS service quality are made on the test platform, these measurements being conducted for different volumes of GPRS traffic in said cell model and in relation to the number of time slots available for GPRS traffic,
said traffic simulation system memorizes data representative of the measurements made on the test platform, this data forming parameters of quality,
for at least one cell configuration and for determined volumes of GSM traffic and GPRS data transfers, a plurality of sessions is generated by said traffic simulation system, forming GSM call arrivals and GPRS data transfers, and said simulation system, taking said quality parameters into account, calculates a level of GPRS performance achieved for said cell configuration,
by dichotomy, said cell model configuration is modified by addition/removal of at least one new time slot available for GPRS traffic or of a transceiver so as to determine the minimum configuration with which it is possible for said level of performance to reach a determined threshold.

According to another particular aspect of the invention, the traffic simulation system, for a given cell configuration, determines:
the number of time slots occupied by GSM circuit calls,
the number of simultaneous GPRS data transfers,
the number of unoccupied time slots available for GPRS data transfers.

According to a further particular aspect, said measurements made on the test platform are units of time or of GPRS transfer rates for one same application, said loading of this application being initiated at the same time on one or more computers of said platform.

According to a further particular aspect, said measurements are made on the test platform under the following conditions:
in a strong field and in static state,
with declaration of time slots available for GPRS,
in the absence of any voice GSM traffic.

According to a further aspect, the transfer time of said application is measured on each computer, the transfer times being collected and processed by the test platform to obtain a matrix of transfer rates in relation to GPRS time slots and to the number of simultaneous transfers, called a first matrix.

According to another particular aspect, the data of said first matrix is compared with said service quality indicator to form a matrix, called a second matrix, which distinguishes between favourable cases in which quality of service is achieved, and non-favourable cases in which it is not.

According to another particular aspect, the traffic simulation system, to calculate said level of GPRS performance corresponding to a cell configuration, generates a time slot occupation matrix, called a third matrix, in relation to the number of simultaneous GPRS transfers, each division in the third matrix representing a percentage of time.

According to a further particular aspect, said level of performance is a level of performance obtained by totalising the divisions of the third matrix corresponding to favourable cases in which quality of service is achieved, or else a level of non-performance obtained by totalising the complementary divisions for which quality of service is not achieved.

According to a further particular aspect, said service quality indicator is a targeted mean rate per session, for a determined type of application, or a percentile rate defined by the criterion according to which a minimum transfer rate is achieved within a determined percentage.

According to a further particular aspect, the targeted mean session rate at peak GPRS traffic times is a percentage of the targeted rate outside said peak traffic times.

A further purpose of the invention is to provide a solution to one or more problems encountered in the prior art, by defining a simulation system for rapid, optimum scaling of the radio interface to meet GPRS traffic and mixed GPRS+voice GSM traffic.

This purpose is achieved with a simulation system to apply the method of the invention, intended to scale the radio interface for GPRS traffic and mixed GPRS+voice GSM traffic, having storage means to memorize data representative of results of GPRS transfer quality measurements made on a test platform or similar for a variable number of GPRS-available time slots, storage means to memorize at least one service quality indicator, storage means to memorize at least two cell configurations and storage means to memorize GSM traffic volumes and GPRS data transfers, characterized in that the simulation system uses this data, via session generation means and cell configuration selection means, to simulate GSM call arrivals and GPRS data transfers, so as to calculate using calculation means a level of GPRS performance obtained for a selected cell configuration.

According to another particular aspect of the invention, said calculation means comprise means for determining time percentages corresponding to states, in the selected cell, defined by the number of time slots available for GPRS data transfers and the number of simultaneous GPRS data transfers.

According to another particular aspect of the invention, analysis means take into account said memorized data representative of GPRS transfer quality measurements made on the test platform to identify and select the time percentages of said states which do not meet said service quality indicator.

The invention, with its characteristics and advantages, will become better apparent on reading the description made with reference to the appended drawings, given as non-restrictive examples, in which.

Figure 5:
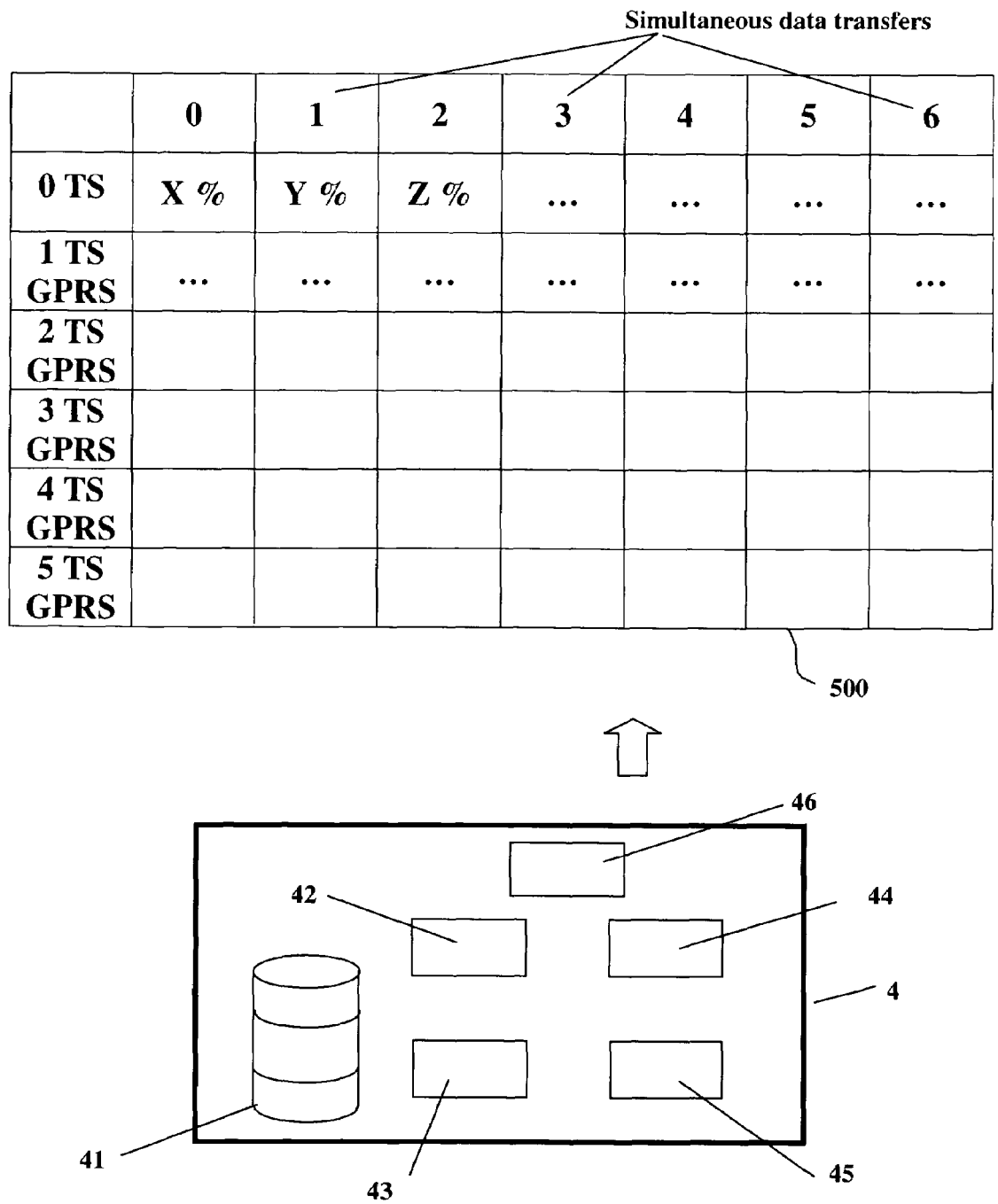
Figure 6:
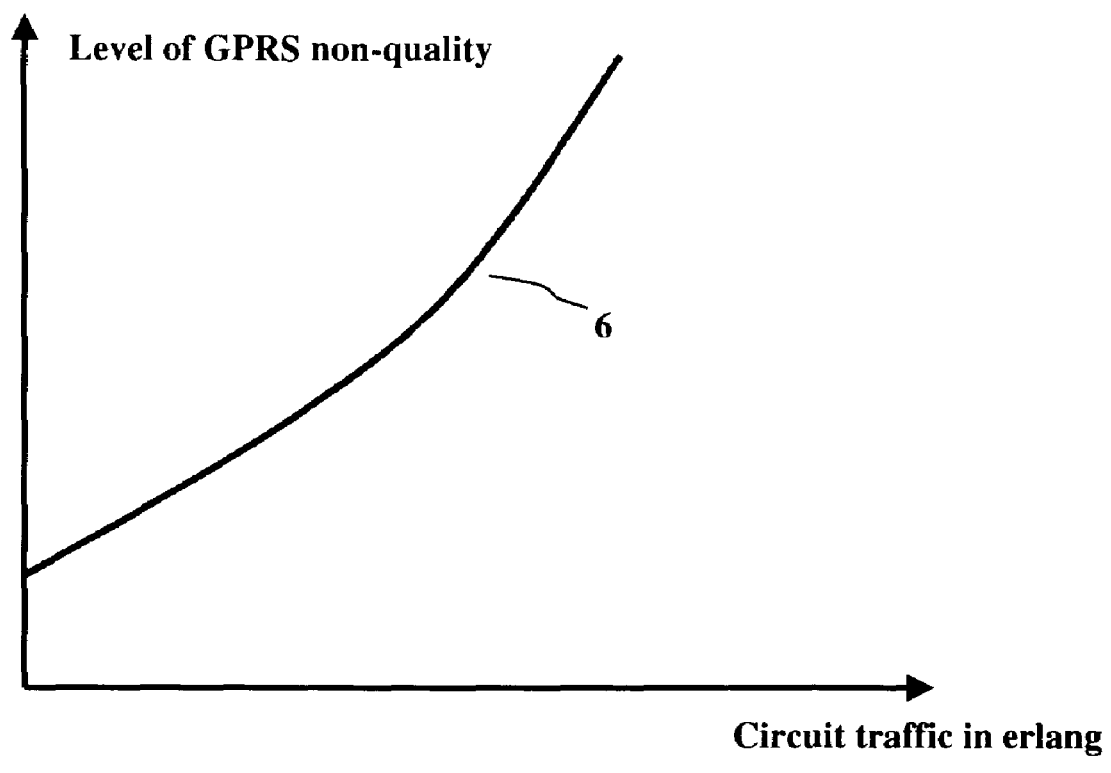

FIG. 5 gives a schematic illustration of an embodiment of the simulation system of the invention and an example, in matrix form, of the results obtained with this system; and FIG. 6 gives an operating curve of results obtained with the simulation system of the invention.

The invention is now described in connection with FIGS. 1 and 2.

Figure 1:
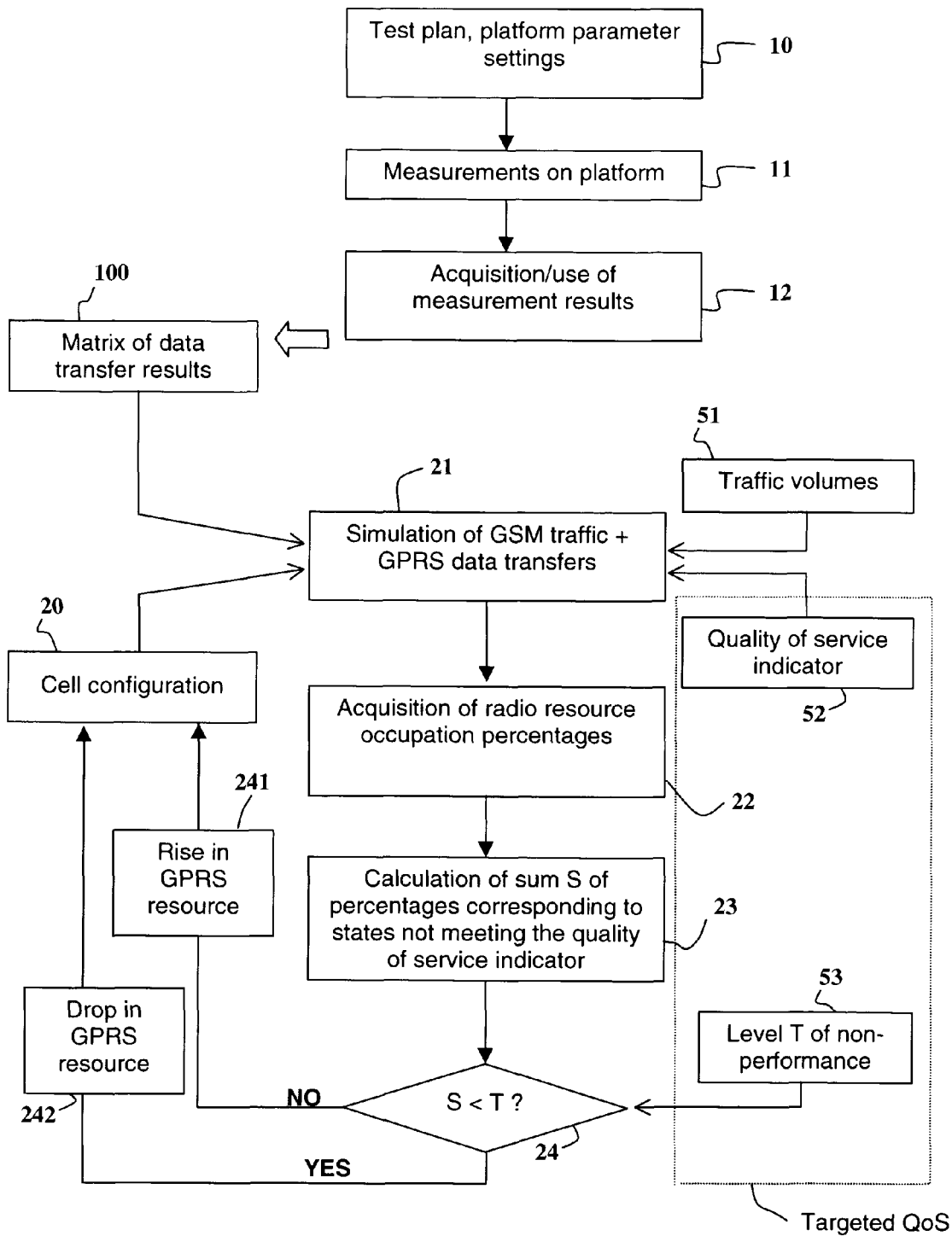
FIG. 1 shows the flowchart of a scaling method according to the invention.

FIG. 1 shows a variant of embodiment of the method of the invention intended to size GPRS traffic. Beforehand it is necessary to organize tests on a service platform 3 comprising a model 30 of at least one cell of a mobile radiotelephone network, as illustrated in FIG. 2, in order to obtain indications on the quality of GPRS data transfers. A test plan 10 is produced by a programme to conduct measurements representative of performance in terms of loading time or waiting time in the cell under consideration, called cell model 30. Said test plan 10 is performed for example for one same application and may consist of measuring loading times of a home page on the Internet or similar for a variable number of simultaneous sessions and time slots (TS) available for GPRS traffic. An operator of platform 3 can, from a menu displayable on an interface between platform 3 and the operator, choose the parameters to be measured or characteristics of test plan 10.

The cell configuration is not fixed for the chosen test plan 10. As illustrated in FIG. 2, cell model 30 may comprise a base station (BTS) equipped for example with two transceivers (TRX1, TRX2). This base station (BTS) forms the interface between the base station controller (BSC) managing the radio resource and mobiles 31.

A set of measurements 11 is made following said test plan 10 which fixes certain conditions to be tested. Therefore measurements are performed for example in a strong field and in static state with declaration of GPRS-available time slots (TS) and in the absence of any traffic on the GSM voice circuit on cell model 30. The mobiles 31 can all be adjusted for a CS-2 type coding schema. Computers using cell model 30 of the network of platform 3 initiate the loading of one same application at the same time to allow reliable measurement of the transfer time of said application onto each computer, and subsequently to obtain a mean transfer time. The measurements made may be repeated the number of times defined by the test plan, for example around forty times, in order to obtain relevant mean results. For some configurations, the number of repeats may be reduced in particular when measurements 12 give converging results. By varying the number of simultaneous GPRS data transfers in cell model 30 and by repeating measurements for an increasing number of time slots (TS) available for GPRS transfers, the measurements 11 performed by platform 3 enable analysis of the cell configurations. Collection and use 12 of results make it possible to generate a matrix 100 summarizing the tests performed via platform 3, as illustrated in FIG. 2. This matrix 100 contains results representative of quality of service within a cell in relation to GPRS time slots (TS) and the number of simultaneous data transfers. These results are given in this matrix 100 for example in the form of mean transfer rates.

Figure 2:
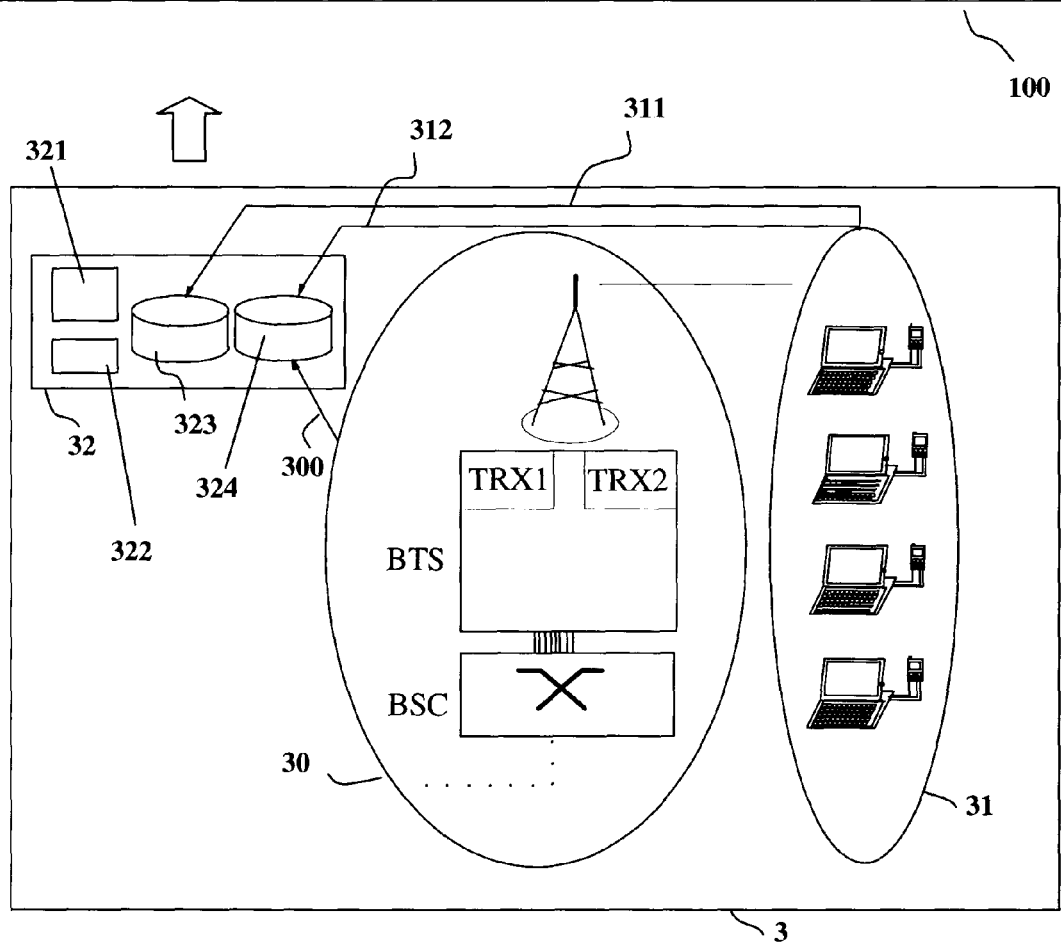
FIG. 2 is a schematic illustration of a service platform and example of results presented in matrix form, derived from a platform test when using the method of the invention.

In one embodiment of the invention, illustrated in FIG. 2, an interface and data processing manager 32 included in platform 3 enables the acquisition and use of measurements 11 made for a predetermined test plan 10. This interface and data processing manager 32 comprises a central unit 321 controlled by memory software 322, a memory 324 of state data or cell model 30 configuration, and a memory 323 recording transfer times 311 or data representative of measurements 11 made during conducting of test plan 10. Said manager 32 comprises means for calculating mean transfer rates obtained in relation to the configuration of cell model 30, i.e. in relation to time slots (TS) available for GPRS 300 and to the number of simultaneous transfers 312.

To ensure satisfactory quality of service and in relation to marketing specifications, a minimum transfer rate threshold per session may be defined by the operator of platform 3, of 14 kbits/s for example. This type of threshold represents targeted network service quality. Several thresholds may be defined, for example a first transfer rate for peak GPRS times and a second transfer rate outside peak network times. In one embodiment of the invention, the targeted rate per session at peak times is a percentage of the rate outside peak times.

The matrix 100 of transfer results obtained subsequent to tests on platform 3 gives information on the quality parameters to be taken into consideration when scaling the radio interface for GPRS data transfers in a cell of a mobile radiotelephone network, for example the number of time slots (TS) needed to obtain a determined sufficient transfer rate. The scaling method of the invention then consists of simulating 21 GPRS traffic and voice GSM traffic for a given cell configuration in relation to these quality parameters and to marketing specifications.

The invention is described below with reference to FIGS. 1, 3, 4 and 5.

Figures 3, 4:
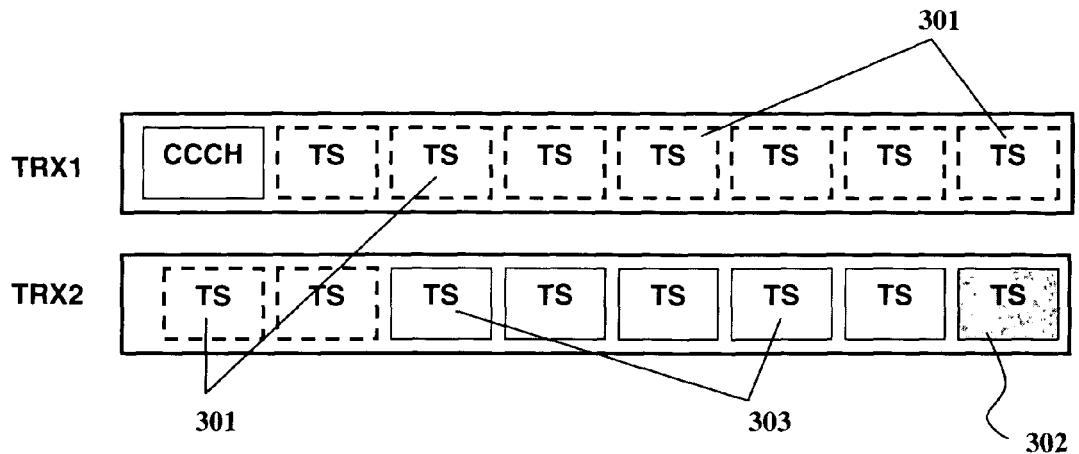
FIG. 3 shows a sample configuration of a cell radio resource.
FIG. 4 is an example of a so-called quality matrix expressing whether or not quality of service is achieved for different operating states of the cell.

Simulation 21 of GPRS traffic and the GSM voice circuit is made using a simulation system 4 having memorized data representative of different cell configurations and measurement results 311 of GPRS data transfer quality performed on a test platform 3. The matrix of data transfer results 100 can therefore be stored in memory means 41 of simulation system 4. Data concerning regional or national traffic volumes 51, for example at peak times and per service, are also stored in memory means 41 of simulation system 4. In one embodiment of the invention, the session type per application as defined in particular in terms of session size and the number of pages downloaded by the marketing department, can be added via an interface and also stored in said memory means 41. In one variant of embodiment, a quality of service indicator 52 such as the targeted mean transfer rate at peak times, as determined by the marketing department, is entered as an additional parameter into memory means 41 of simulation system 4. Said indicator 52 may also be a percentile rate defined by the criterion according to which a minimum transfer rate is achieved within a determined percentage, for example 90% of cases. It is possible at this stage to analyse the matrix of transfer results 100 via an analysis programme 42 of simulation system 4 and to determine the conditions which do not fulfil marketing specifications. Matrix 400 illustrated in FIG. 4, called quality matrix, represents a sample result provided by said analysis programme 42 with which it is possible to distinguish between favourable cases in which quality of service is achieved and non-favourable cases in which it is not. As an illustration, matrix 400 of FIG. 4 shows that, to achieve targeted quality of service, at least four times slots (TS) for example need to be available for GPRS when 2 data transfers are made simultaneously.

As shown in FIG. 5, simulation system 4 according to the invention comprises session generation means 43 and cell configuration selection means 44. Before starting a simulation to optimise the scaling of the radio interface and allocate a certain number of time slots (TS) to GPRS, a type of network cell configuration 20 is selected using said selection means 44. FIG. 3 schematically shows an example of cell configuration 20 with a base station equipped with two transceivers (TRX1, TRX2). In the example in FIG. 3, the radio resource is divided into a common control channel (CCCH), nine channels for time slots (TS) dedicated exclusively to voice GSM 301, one channel for a time slot (TS) dedicated exclusively to GPRS 302, and five channels for time slots (TS) shared by the GSM circuit and GPRS 303.

Once the cell configuration 20 is selected, simulation system 4 uses data stored in memory means 41 to simulate 21 via said session generation means 43 arrivals of GSM circuit calls and requests for GPRS transfers. Simulation system 4 therefore simulates a traffic and, in continuous manner via measurement results 311 previously recorded on platform 3 and transferred to said simulation system 4, estimates for said selected cell configuration:
  the number of time slots TS occupied by GSM circuit calls,
  the number of simultaneous GPRS data transfers,
  the number of unoccupied time slots (TS) available for GPRS transfers.

At the end of traffic simulation 21, said simulation system 4, via calculation means 45, calculates occupation percentages 22 of the radio resource. Percentages of occupation times 22 of the radio resource, established in relation to the number of time slots (TS) available for GPRS and to the number of simultaneous GPRS transfers, may all be grouped together in the form of a matrix 500 as illustrated in FIG. 5. Said analysis programme 42 makes it possible to identify and select the time percentages of said states not fulfilling said quality of service indicator. On the basis of these percentage results, and taking into account the selection made by analysis programme 42, said calculation means 45 of simulation system 4 totalise all occupation percentages corresponding to unfavourable cases in respect of targeted quality of service. For example, as indicated by matrix 400 in FIG. 4, all the cases corresponding to a time slot (TS) available to GPRS for one or more data transfers do not meet expected quality of service. This calculation 23 of the sum S of percentages corresponding to undesirable cases is followed by a comparison 24 between said sum S and a level T of non-performance 53 whose parameter is entered into memory means 41 of simulation system 4. The cell configuration is considered as giving qualitative performance if sum S remains lower than non-performance level T. In one embodiment of the invention, this level of non-performance T is less than 16%, varying between 5 and 10% for example. In a different variant of embodiment, calculation means 45 may determine the sum of percentages corresponding to cases in which quality is met i.e. enabling data transfer conditions at least reaching the level of said quality indicator. In this variant, the sum must exceed a performance level of 100-T % so that targeted quality can be met. Irrespective of the variant chosen, simulation system 4 makes it possible to obtain a level of GPRS performance representative of the quality set for the selected cell configuration 20.

In the method of the invention the generation of sessions 21, using simulation system 4 combined with unit measurements 11 made on platform 3, therefore enables a quality of service to be determined corresponding to a traffic entered as a parameter 51 and a given cell configuration 20.

In relation to the result of said comparison 24, the selected cell configuration 20 is modified by means of a cell configuration programme 46 by addition/removal of at least one new time slot (TS) available for GPRS traffic or of a transceiver TRX. By dichotomy, simulation system 4 determines the minimum configuration allowing said level of performance to reach a determined quality threshold. In the embodiment shown in FIG. 1, if the sum of percentages S is greater than the level of non-performance T, a GPRS-available time slot (TS) is added 241 by said configuration programme 46. For this purpose several possibilities are offered. Following the example in FIG. 3, in which two transceivers (TRX1, TRX2) provide 6 GPRS-available time slots (TS)—of which 5 are shared—one shared time slot 303 may be converted into a time slot (TS) dedicated to GPRS 302. A time slot (TS) dedicated to voice GSM 301 may also be converted into a shared time slot 303. Since improvement in GPRS quality must not be achieved to the detriment of voice GSM, the addition of a time slot (TS) for GPRS may be made by adding an additional transceiver (TRX). Subsequent to this addition 241, a subsequent modified cell configuration 20 is selected and the process generated by simulation system 4 is repeated. For as long as the targeted quality is not attained, the cell configuration 20 is modified with an increase in the radio resource allocated to GPRS. The quality of service indicator 52 and level T of non-performance 52, which can be parameterised, enable definition of a targeted quality of service, Qos, according to scaling cases to be handled.

Still with reference to the embodiment in FIG. 1, when the sum of percentages S is lower than level T of non-performance, a decrease 242 in the radio resource allocated to GPRS is made via cell configuration programme 46. With the method of the invention, it is therefore possible, by dichotomy, to achieve scaling of the radio interface of a given cell for a given traffic 51.

In one variant of the invention, the type of modification to be made to the cell configuration may be made by an operator via an entry interface (not shown) of simulation system 4.

In one embodiment of the invention, the traffic volumes entered as a parameter into memory means 41 of simulation system 4 are expressed in erlang, i.e. in resource occupation rates, and in megaoctets of WWW or web or e-mail or FTP sessions or any other traffic model. The volume of traffic for the GSM circuit may correspond to the maximum traffic handled by 3 standard transceivers (TRX), for example for a circuit inhibition rate of 2%. This inhibition rate may evidently be adjusted to other values. The packet traffic, corresponding to GPRS transfers, which is taken into account in parameterised traffic volumes 51 is derived from traffic forecasts formulated by marketing departments. This packet traffic may be distributed pro rata to GSM circuit traffic.

In one variant of embodiment, the peak traffic times for GPRS correspond to peak traffic times for the GSM circuit. The matrix 500 of time slots (TS) free for GPRS in relation to the number of simultaneous sessions is produced for each pair of circuit/packet volumes 51 by calculation means 45 of simulation system 4. Therefore the second division (Y%) of this matrix 500, as illustrated in FIG. 5, indicates the percentage of time at peak traffic hours when there was a GPRS session and no free time slot (TS).

It is possible to use the results obtained with the method of the invention by plotting, for a cell of fixed configuration, a curve 6 of said level T of non-performance, also called level of GPRS non-quality, in relation to GSM traffic as shown in FIG. 6. With said curve 6 it is possible to quantify the number of network cells requiring an additional standard transceiver (TRX).

One of the advantages of the invention lies in its ease of use, overcoming time slot allocation algorithms of network infrastructure constructors. The scaling method of the invention involves two steps which remain simple for determining the changes to be made: the organization of quality tests on a platform, and a simulation phase to determine projected cell configurations. The acquisition of quality results in the form of a matrix 500 can be swift and these results give a regular reflection, in relation to changes within the mobile radiotelephone network, of the quality of service obtained by users. It is easy to assess the consequences of network modifications by performing tests on said platform 3.

Another advantage is to allow easy testing of any new algorithm or operating function applied by the standard or the provider, and to calculate the impact of said operating function on the network.

Another advantage of the invention lies in improved radio resource management. The radio resource allocated to GPRS traffic represents a high cost when this traffic is low. The radio resource, expensive to install, can be put to better use by means of the scaling method of the invention. The results obtained with this method can also be used to better manage the service offer, for example by reducing service costs for users whenever the radio resource is under-used.

The invention sets out to meet increasing needs in quality of service by adapting cell configuration 20 in optimum manner to the various changes affecting the network. With the invention it is possible for example to scale the radio resource very easily, subsequent to any increase in communication capacities of mobile telephones on different radio resources. If circumstance so require, the simulation parameters can also be rapidly modified. The invention also provides the possibility of simulating several solutions.

It will be obvious for persons skilled in the art that the present invention allows embodiments in numerous other specific forms while remaining within the scope of application of the invention as claimed. Consequently, the embodiments described are to be considered as illustrations but can be modified within the sphere defined by the scope of the enclosed claims, and the invention is not to be limited to the details given above.

What is claimed is:

1. Method for scaling the radio interface for GPRS traffic and mixed GPRS and voice GSM traffic, using a test platform comprising at least one cell model of a mobile radiotelephone network and a traffic simulation system memorizing at least one quality of service indicator, at least one cell configuration and traffic volumes for voice GSM and GPRS data transfers, this method comprising:

measurements representative of GPRS quality of service are performed on test platform, these measurements being made for different volumes of GPRS traffic in said cell model and in relation to the number of time slots available for GPRS traffic;

said traffic simulation system stores in memory data representative of measurements made on test platform, this data forming quality parameters;

for at least one cell configuration and for determined volumes of GSM traffic and GPRS data transfers, a plurality of sessions is generated by said traffic simulation system, forming arrivals of GSM calls and GPRS data transfers, and said simulation system, taking said quality parameters into account, calculates a level of GPRS performance achieved for said cell configuration;

by dichotomy, said configuration of cell model is modified by addition/removal of at least one new time slot available for GPRS traffic or of a transceiver, in order to determine the minimum configuration enabling said level of performance to attain a determined threshold.

2. Method according to claim 1, wherein the traffic simulation system, for a determined cell configuration, estimates:

the number of time slots occupied by GSM circuit calls, the number of simultaneous GPRS data transfers,
the number of unoccupied time slots available for GPRS data transfers.

3. Method according to claim 1, wherein said measurements made on test platform are measurements of time units or GPRS transfer rates for one same application, the loading of this application being initiated at the same time on at least one computer of said platform.

4. Method according to claim 1, wherein said measurements are performed by test platform under the following conditions:

in a strong field and in static state
with declaration of time slots available for GPRS
in the absence of any voice GSM traffic.

5. Method according to claim 3, wherein the loading time of said application is measured on each computer, the loading times being collected and processed by test platform to obtain a matrix of transfer results in relation to GPRS time slots and to the number of simultaneous data transfers, called a first matrix.

6. Method according to claim 5, wherein the data of said first matrix is compared with said quality of service indicator to form a matrix, called second matrix, distinguishing between favourable cases in which quality of service is attained, and non-favourable cases in which it is not.

7. Method according to claim 1, wherein the traffic simulation system, to calculate said level of GPRS performance corresponding to a cell configuration, generates a matrix of time slot occupation, called a third matrix, in relation to the number of simultaneous GPRS data transfers, each division in the third matrix representing a time percentage.

8. Method according to claim 7, wherein said level of performance is a performance rate obtained by totalising the divisions in the third matrix corresponding to favourable cases when quality of service is achieved, or else a rate of non-performance obtained by totalising the complementary divisions for which quality of service is not reached.

9. Method according to claim 1, wherein said quality of service indicator is a targeted mean rate per session, for a determined type of application, or a percentile rate defined by the criterion of a minimum rate within a determined percentage.

10. Method according to claim 9, wherein the targeted mean session rate at peak GPRS traffic times is a percentage of the targeted rate outside said peak times.

11. Simulation system for use of the method according to claims 1, intended to scale the radio interface for GPRS traffic and mixed GPRS and voice GSM traffic, having memory means to store memorized data representative of measurement results of GPRS transfer quality made on a test platform or similar for a variable number of time slots available for GPRS, memory means to store at least one quality of service indicator, memory means to store at least two cell configurations and memory means to store GSM traffic and GPRS transfer volumes, characterized in that the simulation system uses this data, via session generation means and cell configuration selection means, to simulate arrivals of GSM calls and GPRS data transfers, to calculate with calculation means a level of GPRS performance obtained for a selected cell configuration.

12. Simulation system according to claim 11, wherein said calculation means comprise means for determining time percentages corresponding, for the selected cell configuration, to states defined by the number of time slots available for GPRS data transfers and the number of simultaneous GPRS data transfers.

13. Simulation system according to claim 12, wherein analysis means take into account said memorized data representative of GPRS transfer quality measurements made on test platform to identify and select the time percentages of said states which do not meet said quality of service indicator.

* * * * *